TWIN BASKET STRAINER WITH PRESSURE-RESPONSIVE BACKWASH MEANS
Filed Sept. 15, 1966 2 Sheets-Sheet 1
FIG. 1.
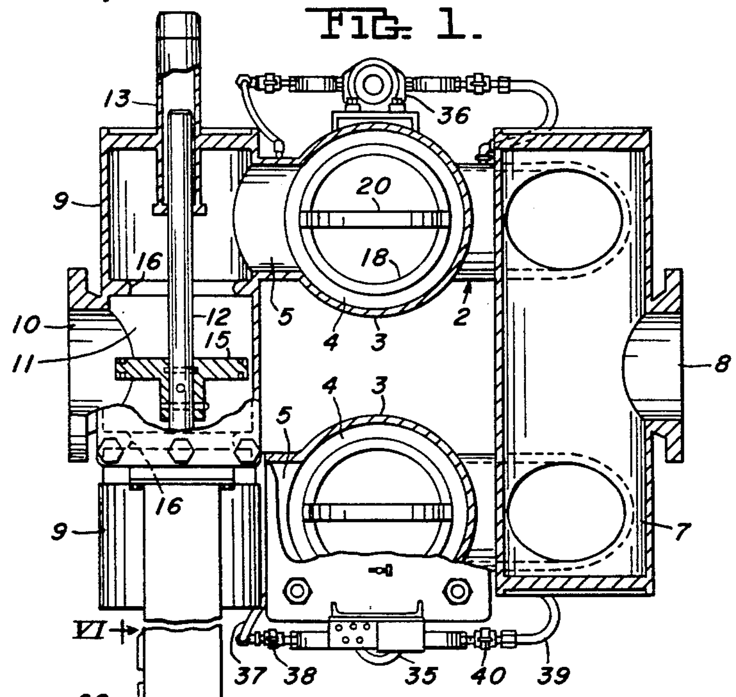
FIG. 6.
FIG. 4.
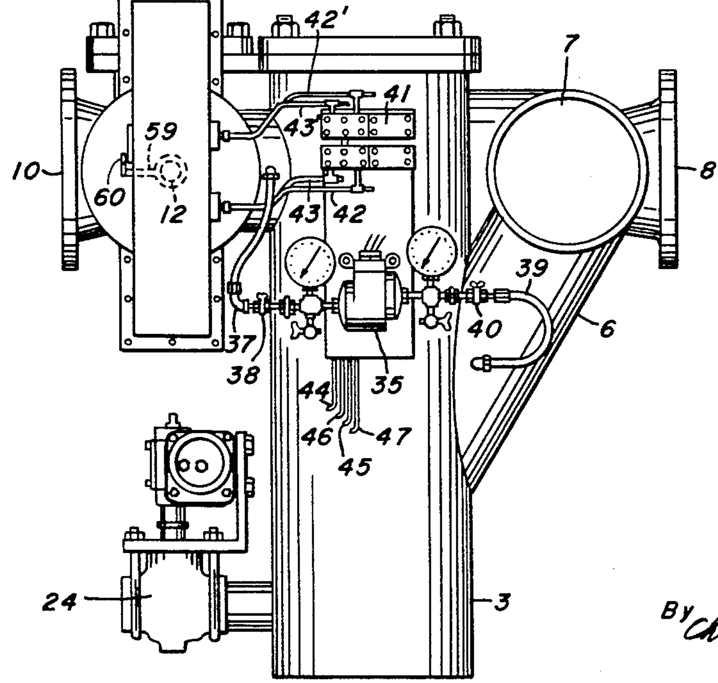
INVENTOR.
HUGH B. CARR
By Christy, Parmelee & Strickland
Attorneys

TWIN BASKET STRAINER WITH PRESSURE-RESPONSIVE BACKWASH MEANS

Filed Sept. 15, 1966

INVENTOR.
HUGH B. CARR
By Christy, Parmelee & Strickland
Attorneys

United States Patent Office 3,397,784
Patented Aug. 20, 1968

3,397,784
TWIN BASKET STRAINER WITH PRESSURE-RESPONSIVE BACKWASH MEANS

Hugh B. Carr, McMurray, Pa., assignor to S. P. Kinney Engineers, Inc., Carnegie, Pa., a corporation of Pennsylvania Filed Sept. 15, 1966, Ser. No. 579,640
3 Claims. (Cl. 210—108)

ABSTRACT OF THE DISCLOSURE

A twin basket strainer having common inlet and outlet ducts with a valve in the inlet duct movable from a position where water is supplied to both strainers to a position where water is shut off from one strainer or the other, each strainer having a pressure-responsive discharge valve so that when its supply is shut off, a backwash of filtered water may flow reversely through the strainer, the inlet duct valve actuating means comprising two pressure-responsive fluid pressure cylinders connected to the valve stem through a lever pivoted to the stem so that each cylinder is effective for moving the valve only half way through its entire distance of travel.

This invention is for a twin basket strainer of the general type disclosed in my copending application Ser. No. 462,268, filed June 8, 1965, now abandoned.

Basket strainers, as the name implies, are generally provided with a basket-like strainer, the walls of which carry the straining media. Water or other liquid to be cleaned flows into the basket and through the walls of the basket to an outlet. As heretofore constructed, the removal of solids which collect in the basket has to be effected by stopping the flow of water through the basket, opening the housing in which the basket is contained, and removing the basket for cleaning.

As disclosed in my application above referred to, basket strainers are commonly provided with twin baskets so arranged that water may flow simultaneously through both baskets, or one basket may be taken out of service while the other one continues to function. The present invention relates to such a twin basket strainer, but constitutes a departure from the conventional basket strainer in that the strainer housing and the baskets are so constructed that the baskets may be flushed without removing them from the casing or housing in which they are positioned. This is accomplished by forming the baskets without the usual bottom, and having each open into a separate sump below each basket with a valved outlet. So arranged, clean water may flow from the outlet of one basket in the reverse direction through the other and out the then open drain valve. With this arrangement water or other liquid to be strained can pass through both baskets at the same time or be selectively diverted entirely through one basket, and part of the water passes through the one basket back-flushed through the other basket to remove the solids.

The present invention also provides an automatic arrangement whereby the backflushing of one basket from water passing through the other one will be automatically effected. This is accomplished by sensing means responsive to the pressure drop through the baskets as the pressure drop increases, indicating a build-up of solids in one basket or the other, the sensing means in turn controlling the operation of the valves to effect backwashing and then restoring normal operation.

The invention may be more fully understood by reference to the accompanying drawings disclosing a twin basket strainer embodying my invention.

In the drawings:

FIG. 1 is a top plan view of the strainer with parts thereof in horizontal section to show the interior construction;

FIG. 4 is a side elevation of FIG. 1;

Figure 2:
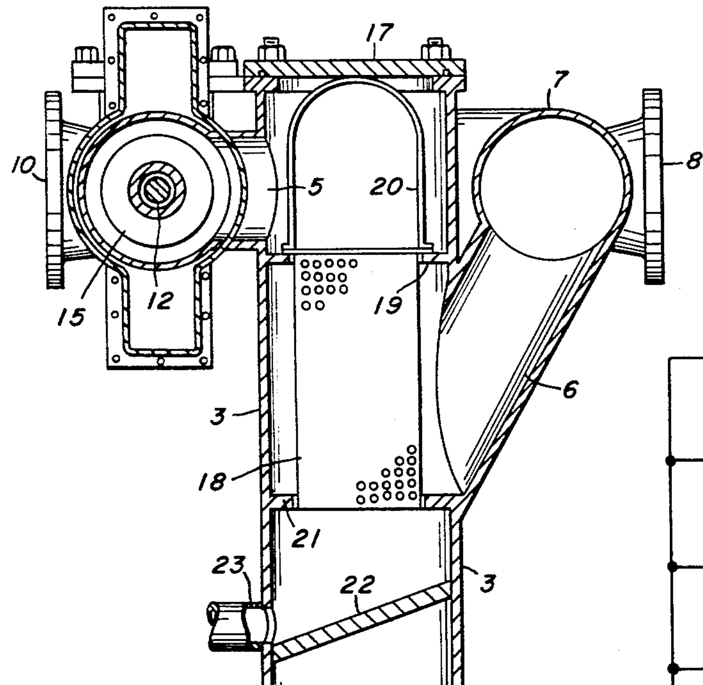
FIG. 2 is a vertical section in substantially the plane of line II—II of FIG. 1.
Figure 5:
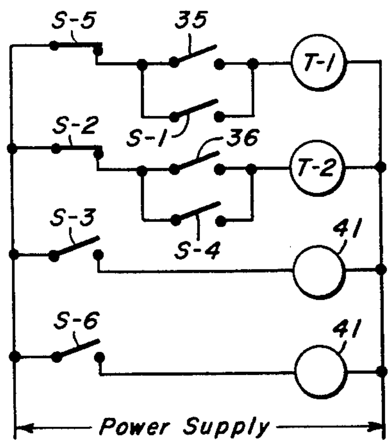

FIG. 5 is a simplified ladder-type circuit which will preclude any movement of the inlet valve under the influence of one differential pressure switch while the other basket is being back-flushed, sometimes called an "either or" circuit; and FIG. 6 is a fragmentary side elevation of the exterior of the enclosure for the valve-operating mechanism with indicia to indicate the position of the inlet valve.

In the drawings, 2 designates the body of the strainer. Each side of the longitudinal center as viewed in FIG. 1 has walls 3 defining two generally circular chambers 4. There is an inlet passage 5 in the casing at the top of each chamber. There is an upwardly sloping outlet passage 6 extending upwardly from the side of each chamber. The outlet passages 6 open into a common outlet duct 7. At the center of the outlet duct 7 there is a strained water outlet connection 8 which is flanged to be bolted into a pipe line. The inlet passages 5 open into chambers 9 at each side of a central inlet connection 10 which is in line with the outlet connection 8 and at the same level so that the strainer can be connected into a straight pipe line.

Figure 3:
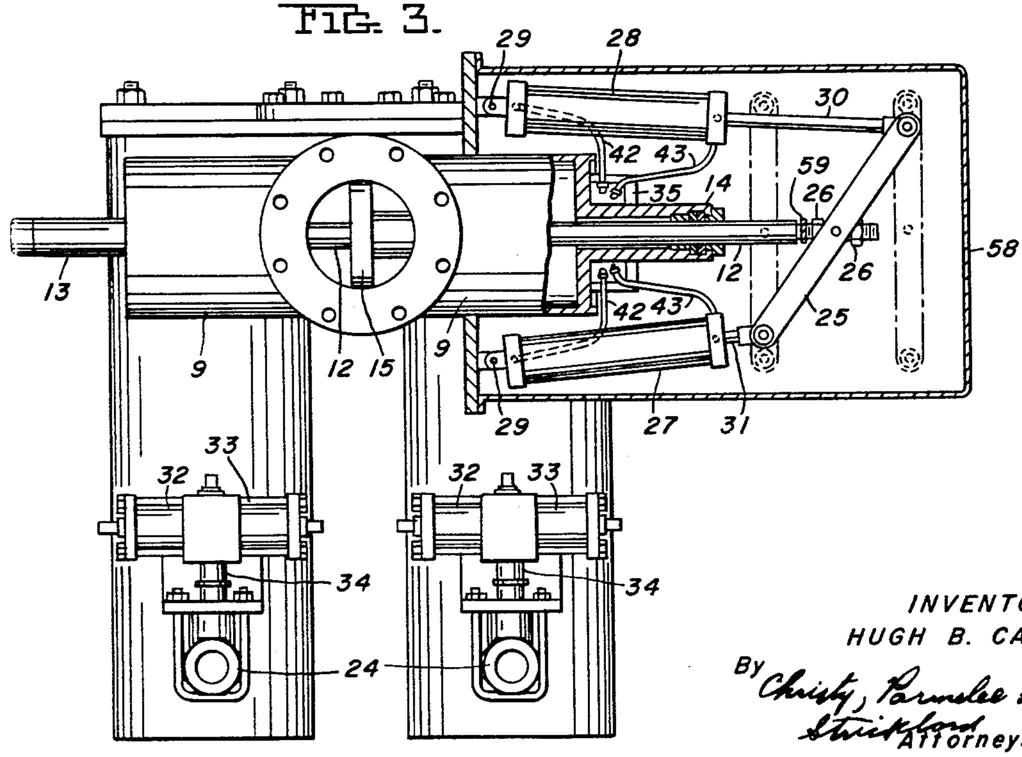
FIG. 3 is a front elevation of the strainer as viewed from the left-hand side of FIG. 1 with the covering for the valve-operating mechanism hereinafter described shown in section, and with a portion of the valve mechanism shown in section.

The inlet connection 10 opens into a central valve chamber 11 positioned between the two chambers 9. There is a valve stem 12 which is slidably fitted at one end in a guide 13 at one end of one of the chambers 9. As best shown in FIG. 3 this stem passes through a guide and packing arrangement 14 at the end of the other chamber 9, this stem thus projecting outside the casing so that it may be moved back and forth.

Secured to the valve stem 12 is a valve 15 which, in FIG. 1, is shown on the center line between the two chambers 9. Each chamber 9 is separated from the inlet chamber 11 by a valve seat 16. By moving valve stem 12 in one direction or the other from the central position, the valve may be engaged against one seat or the other. When it is in the middle position, water from the inlet can flow into both of the chambers 9, but when it is moved against one of the valve seats 16, then the incoming water or other liquid can flow only into the other chamber 9. The valve arrangement is in effect a double globe valve.

Each of the vertical chambers 4 has a removable cover 17. In each chamber there is a strainer basket 18 of smaller diameter than the chamber 4, the walls of this strainer providing straining media such as is commonly used in basket strainers. It is supported at its top on a ledge 19 inside the strainer casing, and it has a bale 20 that contacts the under side of the cover 17 to hold the top rim of the basket 18 seated on the ledge 19.

At the lower end of each basket, which is an open-ended cylinder, the casing has a circumferential flange 21 into which the lower end of the basket snugly fits. With this arrangement there is an annular space around the outside of the basket and the wall 3 of the chamber so that water which comes in through the passage 5 may pass down through the basket, out through the side walls of the basket into this annular space, and flow from this annular space through the outlet 6 into the cross duct or outlet duct 7. The bottom of the cylindrical casing 3 has an inclined closure plate 22 spaced below the basket and which slopes downward toward a drain pipe 23. There is a plug valve 24 in this drain pipe which is normally closed so that incoming water or other liquid cannot escape through the drain 23, but must pass through the straining media in the side walls of the basket 18. A drainage sump is provided by this construction under each basket.

With this arrangement it will be seen that if the valve 15 is moved against one of the seats 16, the supply of incoming liquid to that strainer will be cut off while the entire input may then continue to flow through its twin strainer into the outlet duct 7. If the drain valve 24 for this basket unit then is opened, some of the clean water will flow from outlet duct 7 in the reverse direction through the outlet passage 6 into the space around the basket 18, forcing solids which have been lodged against the straining media inside the basket away from the straining media and the water, together with these solids so removed from the straining media, will flow into the sump and out through the drain 23. On closing the drain 23 and moving the valve away from the seat against which it is seated, normal straining operation may be resumed. In this manner the basket can be cleaned from time to time without removing it from the casing, and in like manner the similar twin basket may be backflushed.

The outer end of the valve-operating stem 12 is threaded and there is a pivoted cross bar 25 carried thereon by the adjusting nuts 26. There are two fluid pressure cylinders 27 and 28, preferably designed to be operated by air pressure, each pivotally secured at one end through a pivoted connection 29 to the exterior of the valve body. Cylinder 27 has a piston and piston rod 31. The outer end of the piston rod 31 is pivotally connected to one end of the cross bar 25. Cylinder 28 has a similar piston and piston rod 30 pivotally connected to the other end of the cross bar 25. These cylinders provide a preferred form of power actuator for the valve.

The plug valve 24 is of a conventional type which is opened and closed by rotating the valve 90°. The preferred form of power actuator for this valve comprises a pair of cylinders 32 and 33 in each of which there is a piston, the two pistons being connected by a rack which turns a gear on the valve stem 34, this being a common construction and forming per se no part of the present invention.

The operation of the cylinders 27, 28, 32 and 35 is controlled by a pair of differential pressure switches. One of these switches, 35, is located on one side of the valve body, and the other one, 36, is on the other side of the valve body. Both switches are arranged similarly, and the connections of one will be described in detail, the connections for the other being similar but controlled from the other side of the assembly. It may be explained that when the valve 15 is in the mid position, the piston rod of one cylinder will always be fully extended and the other fully retracted and the cross bar, as shown, will be diagonal. When the valve is seated on one seat, both pistons will be fully retracted and the cross bar will be vertical, as indicated in dotted lines, and when the valve 15 is on the other seat, both pistons will be fully extended and the cross bar again will be vertical as also indicated by dotted lines at the right side of FIG. 3.

There is a pipe connection 37 leading from the inlet connection 5 for one of the baskets to one side of the differential pressure switch 35, and there is a petcock 38 between the pipe 37 and the switch 35. There is a similar pipe 39 leading from the outlet duct 6 of the same strainer unit to the other side of the differential pressure switch 35, there being a petcock 40 between the pipe 39 and the differential pressure switch. In addition to each petcock there may be a pressure gauge in lines 37 and 39, as illustrated.

By reason of these pipe connections the differential pressure switch is responsive to pressure on the inlet side of the strainer and pressure on the outlet side of the strainer for the basket to which it is applied.

Referring to FIGS. 3 and 4, the cross bar 25 is in a diagonal position and the valve 15 is in the mid position. The piston rod of cylinder 27 is fully retracted and the piston rod of cylinder 28 is fully extended. Assuming first that valve 15 is to be moved from the neutral position toward the right as viewed in FIG. 3, air under pressure is directed by valve 41 through pipe 42 to drive the piston for cylinder 27 to the right and when the piston has effected this movement, the valve stem will have traveled half as far, that is from the mid position to a seating position to block off the flow of water to the strainer controlled by differential pressure switch 35. This is the dotted line position for the cross bar 25 as indicated at the right of FIG. 3. At the same time air in the right end of the cylinder will be vented through pipe 43. No operation of the piston in cylinder 28 takes place at this time.

When the valve 15 is to be restored to the mid position, either of the pistons in cylinders 27 and 28 may be driven to the fully retracted position by supplying air under pressure through its pipe 43 and venting through pipe 42. Normally it would be cylinder 28. If, however, the second basket requires flushing at the time the flushing of the first basket is stopped, both cylinders 27 and 28 will be supplied with air through pipes 43 and vented through pipes 42, so that both pistons move to the retracted position, so that the valve stem 12 would be moved a full stroke instead of a half stroke to immediately shut off the flow of water to the other basket. After the other basket has been flushed, cylinder 28 may be energized to drive its piston to the position shown in FIG. 3, moving the valve stem and valve half as far to the middle position. Also, the valve could be returned to the middle position by energizing cylinder 27 to move its piston to the extended position, leaving the piston of cylinder 28 in the retracted position, but the simpler arrangement is that shown in the drawings, so that under most conditions cylinder 27 would operate the valve for one basket and 28 the other basket, and only when the valve had to be moved from one fully closed position to the other would there be any functioning of the two cylinders together. If FIG. 3 represents the normal relation of the parts, that relation would thereafter prevail, and with the valve in neutral position the piston of cylinder 27 would be retracted and that of cylinder 28 extended.

At the time this operation occurs, the plug valve 24 for the same side of the assembly will of course be closed. The differential pressure valve 41 will also be effective to admit air or other operating fluid through pipe 44 to the left-hand end of cylinder 32 and through pipe 45 to the left-hand end of cylinder 33, while air from the left-hand end of the cylinders 32 and 33 will be exhausted through pipes 46 and 47 respectively. For clarity of illustration, the pipes 42 and 43 are broken off in FIG. 4 and are not shown in the other figures since these connections are conventional and easily understood by those skilled in the art. The valves at 41 are simply two electrically operated two-position four-way valves commonly used in fluid pressure cylinder devices, and the pressure-responsive switch 35 moves one valve between its two positions and pressure-responsive switch 36 effects the movement of the other, these details per se forming no part of the present invention.

Assuming that pressure-responsive switch 35 has operated to move the valve to close the basket against which it is mounted to shut off the water supply thereto, the entire flow of water will then be through the other basket, which is the upper one as viewed in FIG. 1, into the common discharge chamber 7. Part of the strained water will flow through the outlet 8, but part of it will flow reversely through the duct 6 around the outside of the basket 18, through the walls of the basket in reverse flow, flushing away any solids that are lodged on the interior of the basket, and this water, together with the solids that are flushed away, drain down the bottom closure plate 22 of the drain sumps into the discharge pipe 23 and out the plug valve 24. The differential pressure switch also includes a timer, and after a predetermined period of time the switch will operate the control valve means 41 and move valve 15 back to the mid position shown in FIG. 3. This is accomplished by reversing the flow of fluid to cylinder 27 through pipes 42 and 43 as above explained.

At the same time the flow of fluid pressure will then be through pipes 46 and 47 and air will be exhausted through pipes 44 and 45 to effect a closure of the plug valve 24 so that the strainer unit which has been flushed and cleaned will then be restored to operative position.

The differential pressure switch 36 for the other basket strainer of the twin unit as above explained functions through electrical circuits for the valving arrangement 41 to effect operation of the valve to close off the other of the two baskets and automatically effect the back flushing thereof along with the opening of its individual plug valve 24.

By having two cylinders 27 and 28, the valve 15 can be brought back to the mid position without over-travel, as would be the case if a single long operating cylinder were used to move the valve stem, since the full travel of either piston alone moves the valve 15 only half the overall length of travel required to move that valve the full distance from one valve seat to the other. The timer is included with the differential pressure switch in order to eliminate any possibility of the mechanism "hunting" after the reverse flushing has started, since, at this time, differential pressure conditions across the strainer will substantially reverse.

One or the other of the two differential pressure switches will operate first, since there is practically no possibility of both encountering the same pressure drop at the same time. After one has signaled to close the flow of water through the basket strainer which it monitors, the circuits are arranged to de-energize the circuit for the other until the first has back-flushed its predetermined time cycle.

Such an arrangement is schematically illustrated in FIG. 5 where the elements of the circuit are represented in the normal position with the inlet valve admitting water to both baskets. Assuming differential pressure switch 35 is closed, simultaneously putting timer relay T–1 into operation, shunt relay switch S–1 is closed around switch 35, and relay switch S–2 is opened to disable differential pressure switch 36, at the same time it closes relay switch S–3 to effect actuation of an air valve 41 to effect operation of the inlet valve toward the right as viewed in FIG. 3, and to effect the opening of the plug valve 24 of the same basket. After the passage of three minutes, or whatever period is called for by the timer, the timer T–1 will open the circuit to open the relay switch S–1, close switch S–2 and open switch S–3. In a similar manner when differential pressure switch 36 closes, it actuates timer T–2 which then effects closing of shunt switch S–4, the opening of switch S–5 to disable differential pressure switch 35, and closes switch S–6 to effect movement of the valving for the other basket to carry out its back-flushing cycle.

The cylinders 27 and 28 and the lever 25 are enclosed within a removable housing 58. An indicator arm 59 attached to the valve stem 12 projects through the side of the housing 58 and has a pointer 60 at its outer end. This pointer is moved back and forth as the piston rod 12 is moved back and forth, and there is indicia as indicated in FIG. 6 with which this pointer registers, showing whether both baskets are in operation, or whether one basket or the other is in operation.

While I have shown and described a preferred embodiment of my invention, it will be understood that various changes and modifications may be made in the construction and arrangement of parts within the contemplation of my invention and under the scope of the following claims. It will also be understood that instead of operating the valve 15 and the plug valves 24 automatically, they can be manually operated, in which case the valve 15 would be moved through the use of a hand screw as disclosed in my copending application above referred to.

I claim:

1. A twin basket strainer having two basket strainer units comprising:

(a) a common inlet supply connection with separate inlet passages leading therefrom into each strainer unit, (b) a common outlet connection into which each unit discharges, (c) each unit having a backwash drain with a discharge valve which may be opened when the supply of water from its inlet is shut off, (d) a selectively operable reciprocable inlet valve means in said common supply connection movable from a central position where water flows from said common supply connection into both units in one direction to shut off the flow of water to one unit and in the opposite direction to move the valve from the central position to shut off the flow of water to the other unit, (e) a valve stem through which said movement of the valve is effected, (f) a cross bar pivotally connected at its center to said valve stem, (g) a first fluid pressure cylinder and piston unit movable between an extended and a retracted position and operatively connected to one end of said cross bar, (h) a second fluid pressure cylinder and piston unit movable between a retracted and extended position and operatively connected to the other end of said cross bar, (i) one of said cylinder and piston units being in retracted position when the other is in extended position and with said cross bar being diagonal to the axis of the valve stem when said valve means is in the central position, (j) whereby the inlet valve will be moved from the central position by operation of one cylinder and piston unit to shut off the supply of water to one strainer by operating one fluid and piston unit from the extended to the retracted position and in the other direction from the central position to shut off the flow of water from the other strainer unit by operation of the other fluid piston unit from the retracted to the extended position, or moved from the position where the flow of water is shut off from one strainer unit to a position where the flow of water is shut off to the other strainer unit and opened to the first by the simultaneous operation of both cylinder and piston units in the same direction.

2. A twin basket strainer as defined in claim 1 in which there is means responsive to an increase in pressure across each strainer unit between its inlet and outlet for monitoring the operation of the separate cylinder and piston units.

3. A twin basket strainer as defined in claim 2 wherein said fluid pressure-responsive means comprises a fluid pressure operated switch and a circuit therefor including a timer actuated by each switch effective for rendering one pressure-responsive switch ineffective for a predetermined interval of time after the first has become effective to shut off the flow of water to the unit which it monitors whereby conflicting operation of the valve is prevented, the backwash drain valve for each unit having means also under the control of the pressure-responsive switch for opening said valve when the inlet supply to its strainer unit is shut off and closing said drain valve when the supply to its strainer is restored.

(References on following page)

References Cited

UNITED STATES PATENTS

| | | | |
|---|---|---|---|
| Re. 23,469 | 3/1952 | Zollinger | 210—108 |
| 1,965,368 | 7/1934 | Burnish | 210—340 X |
| 2,068,468 | 1/1937 | Phillips | 210—333 |
| 2,359,938 | 10/1944 | Quiroz | 210—333 |
| 2,854,140 | 9/1958 | Muller | 210—333 X |

REUBEN FRIEDMAN, *Primary Examiner.*

F. SPEAR, *Assistant Examiner.*